Feb. 6, 1962 B. C. ECK 3,019,963
RADIAL BLOWER FOR GASES WITH HIGH DUST CONTENT
Filed July 8, 1955 4 Sheets-Sheet 1
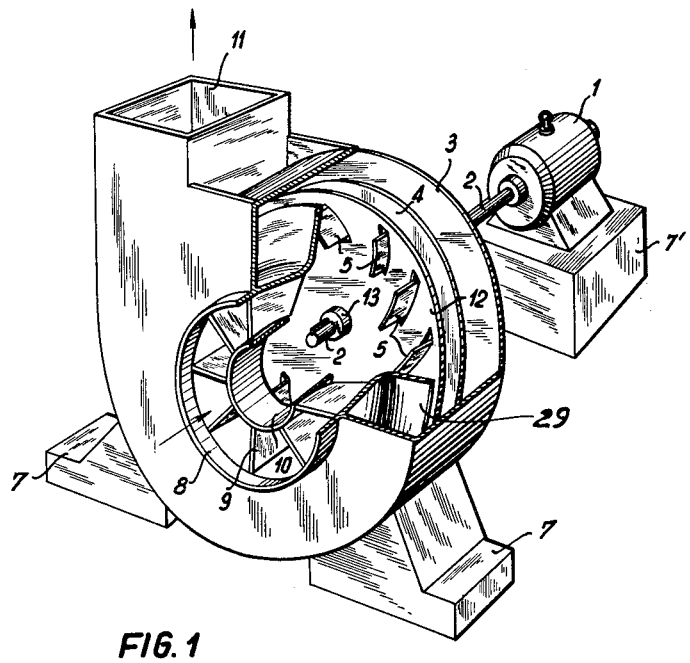
FIG. 2
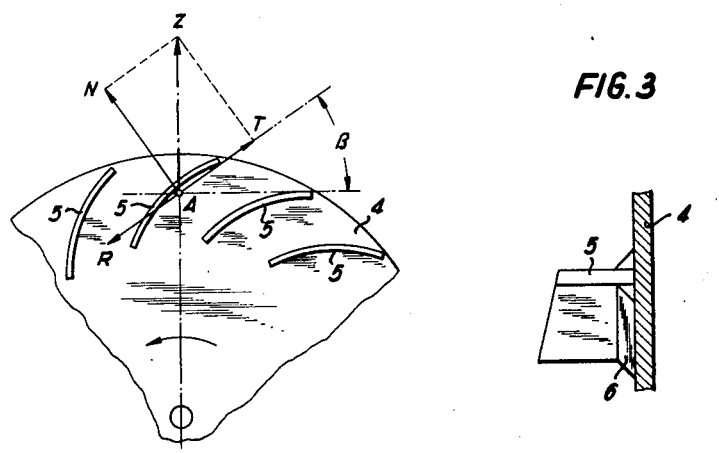
FIG. 1
FIG. 3
INVENTOR
Bruno Christian Eck
By
Patent Agent Feb. 6, 1962 B. C. ECK 3,019,963
RADIAL BLOWER FOR GASES WITH HIGH DUST CONTENT
Filed July 8, 1955 4 Sheets-Sheet 3

INVENTOR
Bruno Christian Eck
By
Patent Agent

Feb. 6, 1962 B. C. ECK 3,019,963
RADIAL BLOWER FOR GASES WITH HIGH DUST CONTENT
Filed July 8, 1955 4 Sheets-Sheet 4

INVENTOR
Bruno Christian Eck
By
Patent Agent

United States Patent Office 3,019,963
Patented Feb. 6, 1962

3,019,963
RADIAL BLOWER FOR GASES WITH HIGH DUST CONTENT
Bruno Christian Eck, Geisbergstrasse 24,
Koln-Klettenberg, Germany
Filed July 8, 1955, Ser. No. 520,878
9 Claims. (Cl. 230—127)

The present invention relates to radial blowers, especially for gases with high dust content.

When radial blowers such as suction blowers or the like are employed for withdrawing gases of high dust content, there exists the danger that the dust will stick to and remain in the impeller. Due to the effect of centrifugal forces, the dust is retained in the impeller so that great deposits of dust will accumulate on the blades and cause difficulties.

Blowers are known in which the deposit of dust in the impeller is avoided by arranging the blades so that they extend in radial or substantially radial direction. Such an arrangement, however, automatically reduces the degree of efficiency of the blower, which fact had to be put up with as unavoidable due to the fact that no better solution was heretofore available.

It is an object of the present invention to provide an improved controllable blower which will overcome the above mentioned drawbacks without a decrease in its efficiency.

It is another object of this invention to provide a blower with increased efficiency for exhausting gases with high dust content.

Still another object of this invention consists in an improved blower which will be particularly useful in connection with the exhaust of gases with a high dust content and which can easily be controlled.

These and other objects and advantages of the invention will appear more clearly from the following specification in connection with the accompanying drawings, in which:

FIG. 1 represents a cutout portion of the impeller of a radial blower, according to the invention.

FIG. 2 is a perspective view of a radial blower according to the invention partly cut open.

FIG. 3 is a portion of the impeller of a radial blower according to the invention.

General arrangement

Figure 1B:
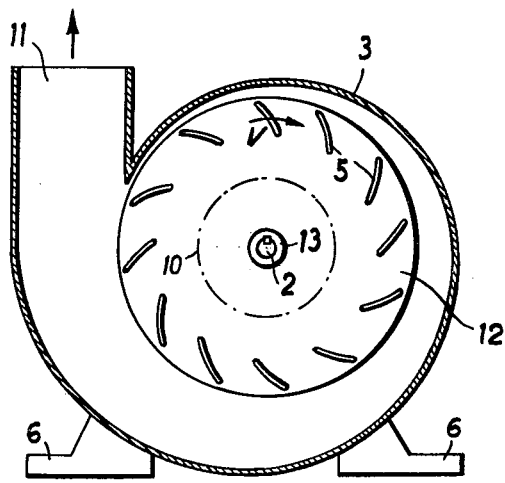
FIG. 1b is a longitudinal section through the spiral casing of FIG. 2.
Figure 1A:
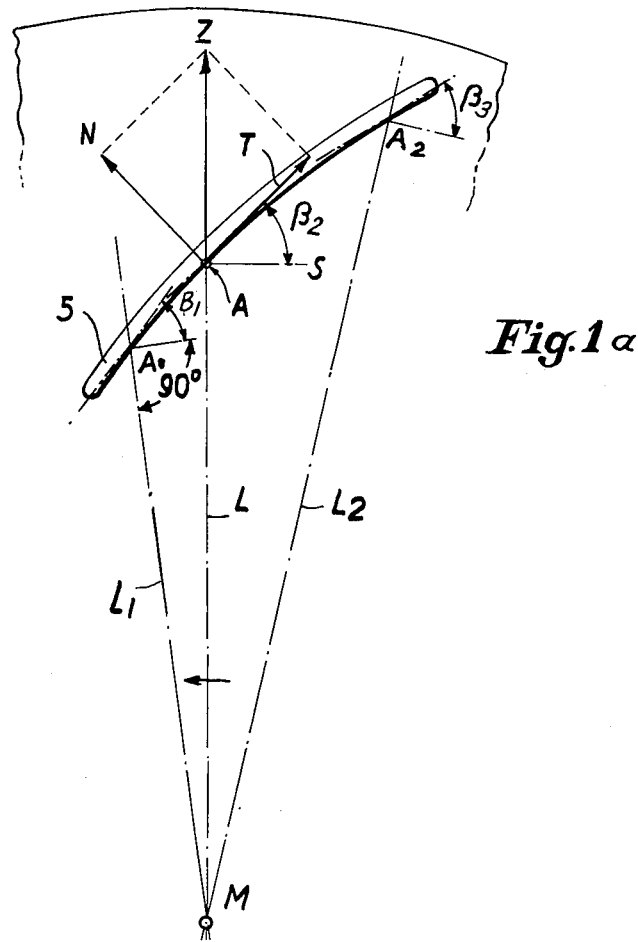
FIG. 1a represents a portion of FIG. 1 but on a larger scale than the latter.

In order to facilitate the understanding of the problem underlying the present invention, reference may first be had to FIGS. 1 and 1a which illustrate a cutout of the impeller of a radial blower. These figures illustrate the equilibrium of the forces which with a rotating impeller act upon a dust grain A.

First the centrifugal force Z produced by the rotation of the impeller acts upon the dust grain A. In this figure, the centrifugal force Z is split up into a normal component of force N perpendicular to the blade, and in a tangential force T in the direction of the blade. The normal component of force N brings about a frictional force R which acts against the tangential force T. The dust grain A will adhere to the blade surface when the product $N \times \mu$ (normal component of force $x$ coefficient of friction) equals or exceeds the tangential force T. Due to the thus caused adherence of dust to the blade surfaces, the above mentioned disturbing deposits may be encountered.

In an effort to solve the problems underlying the present invention, after rather difficult tests extending over a considerable period of time, the inventor finally succeeded in ascertaining the factors underlying the present invention: the blades of the impeller must be so designed that the blade angle at each point of the blade will exceed the friction angle of the dust. The blade angle is found by drawing a tangent T (FIG. 1a) at point A to the inner blade surface. The said tangent will then confine with line S the so-called blade angle which has been designated with the letter $\beta$. Line S is perpendicular to line L which latter extends radially outwardly from the center point M of the through point A. The said two lines S and L confine with each other an angle of 90°. The angle $\beta$ thus indicates the inclination or adjustment of the blades at each blade point with regard to the direction of movement at each instant of the rotative movement (tangent). Through each point of the blade inner surface a radially extending line may be drawn, for instance the line $L_1$, $L_2$. For each point the same picture will be obtained. The tangent in each respective point $A_1$, $A_2$ and the vertical to the lines $L_1$ and $L_2$ will again form an angle $\beta$.

The "friction angle," a term well understood in the blower art and frequently also called "angle of slope" or "gradient" is defined as the angle between the horizontal and an embankment formed when a major quantity of dust material is poured in loose condition upon a horizontal surface. It will thus be clear that the friction angle of a material will depend on the respective material itself. Most industrial dusts have a friction angle of from 30° to 50°. However, the requirement of a high degree of efficiency of the blower makes it necessary to maintain the blade angles rather small. Furthermore, deposits of dust on the transfer edges, i.e. the edges where the material is transferred from the blades to the impeller, are likewise to be avoided. To this end, the transfer edges are not designed rectangular but inclined or rounded.

In order to increase the degree of efficiency, a certain dimensioning of the impeller within narrow limits has proved particularly advantageous. It has also been found highly beneficial to impart a pre-twist or swirl upon the drawn-in air containing the dust. Twist or swirl losses which can be avoided should be avoided and, if possible it should be avoided that the air after having received said swirl or twist, would have to pass unnecessary long distances.

Furthermore, simple means have been developed for controlling the blower, which means will make it possible properly to control the blower by varying the admission. According to the present invention, the problem underlying the present invention has been solved by designing the blades of the blower so that each blade of the blower will have the same or substantially the same blade angle over the entire blade, which angle with regard to the circumference of the impeller, is somewhat greater than the frictional angle of the dust material. The result of the above mentioned rather difficult and long tests with regard to the customary industry dust or grains consists in that the blade angle must in conformity with a feature of the present invention be between 38 and 58° if with a suction blower having a degree of efficiency as high as possible, dust deposits on the blades are to be avoided. The cross sections of the blades are intended through a fillet or inclination to merge with the impeller disc to thereby avoid sharp edges. With such design of the blades, considerably better degrees of efficiency are obtained than is possible with the heretofore known blowers with radially extending blades. In addition to this higher degree of efficiency, the further advantage is obtained that when no dust is delivered no particular wear will occur in the corners which are otherwise particularly exposed to a dust whirl.

The intensive tests and findings leading to the present invention have proved that to avoid dust deposits on the back side of the blades as done in conformity with the above described features of the invention will by itself not be sufficient. Also at the rounded entrance portion of the cover disc, dust may deposit for the same reasons as those mentioned above. In order to avoid dust accumulations also at the rounded entrance portion, it is necessary, in conformity with a further feature of the invention, that the smallest angle which any section of the rounded entrance portion may form with the axis of the blower will likewise be greater than the angle of friction and will be within the range of 38 to 58°.

The tests preceding the present invention also have proved that when materializing the present invention, certain dimensions of the impeller will bring about optimum degrees of efficiencies. These dimensions will later be set forth in connection with the drawings.

A further feature of the invention leading to an increase in the degree of efficiency consists in that the withdrawn dust-containing gas is subjected to a strong pre-twist in the meaning of a co-twist (Mitdrall). This may for instance be effected by a preceding guiding device or other devices known per se for producing a twist, for instance by a preceding spiral suction casing.

When designing a blower according to this feature of the invention, it has been found that not only does the degree of efficiency obtain a high value, but also the requirement of power of such blower will be a maximum within the range of the optimum degree of efficiency. Without the twist according to the present invention, the requirement of power increases further very considerably so that in most instances for this reason a considerable overdimensioning of the driving motor is required. The new advantages derived from this feature of the invention represent a considerable advance in the art.

Particular care has to be taken in such instances in which strongly corrosive types of dust are passing through the blower. In this connection, there exists the possibility that the guiding apparatus is subjected to a particularly strong wear. In order also in such instances to obtain the advantages according to the characteristic features of the invention set forth above, a device is expediently employed for creating said twist, in which no blades or the like are present in the main gas stream. In these instances, the twist may be obtained, according to a further feature of the invention, by introducing air under pressure from the spiral casing into the suction conduit so that a branch jet or branch stream of the compressed air will convey a turning impulse upon the taken-in quantity of air.

A good control of the blower may according to the invention be obtained by controlling the air admitted to the blades. To this end, a disc displaceable along the axis of the impeller is slidably mounted which extends up to the blades or may surround the blades. In this connection, the guiding apparatus may, if so desired, be united with this disc. By means of this disc, and this applies to any quantity to be delivered, the admission is obtained at the best degree of efficiency, and it will be avoided that the whirl will detach itself from the walls. The avoidance of whirls in its turn results in a considerable reduction of the wear because the whirls in dust feeding blowers automatically bring about a greater wear. Thus, when providing a blower with the features according to the present invention, no portions or sections are present which will bring about a greater wear. With a blower according to the invention, the wear is kept down to a minimum so that the wheel with a blower according to the invention does not have to be replaced even after a long time of use.

*Structural arrangement*

Referring now to the drawings in detail, FIG. 1 has been dealt with in the introductory portion of the specification in in order to explain the problem underlying the present invention.

With regard to FIG. 2, this figure shows an arrangement comprising a driving motor 1 which through a shaft 2 drives the impeller 4 located in the spiral casing 3. The front side of the impeller 4 carries blades 5. The spiral casing 3 and the motor 1 are journalled on supports 7, 7' respectively.

The air taken in enters the spiral casing 3 through the intake connection 8 and passes through the guiding device 9 which carries a hollow hub 10 in the center thereof. Due to the effect of the rotating blades 5, the taken-in air is then delivered into the spiral-shaped annular channel of the spiral casing 3 from where the air passes through the discharge connection 11. As will furthermore be evident from FIG. 2, the arrangement shown therein also comprises a disc 12 which surrounds the blades of the impeller 4 and is connected to the hub 13 which latter can axially be displaced on shaft 2. The cover disc 29 is located in front of the impeller 4 with the blades 5.

According to a feature of the invention, the blade angles at each section of the blades 5 must be uniform or be substantially uniform and must be within the range of from 38 to 58°. The blade angles involved in this connection are shown in FIGS. 1 and 2 and are designated in FIGURE 1 with the letters $\beta_1$, $\beta_2$, and $\beta_3$.

FIG. 3 illustrates how the blade cross section changes over into the impeller disc 4 through inclined strips 6.

Figure 4:
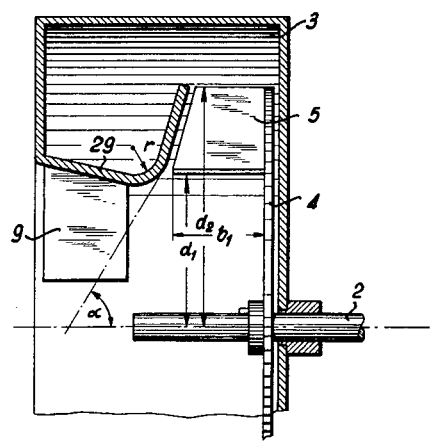
FIG. 4 represents a longitudinal section through a radial blower of the invention.

FIG. 4 shows among other features the axial tubular intake section 29 that terminates in an outwardly flaring frusto-conical section at the face of the impeller. These sections are joined by a rounded portion. In conformity with the present invention, it is necessary that the smallest angle $\alpha$ formed by the frusto-conical section of the entrance section with the axis of the blower is within the range of from 38 to 58°. FIG. 4 also shows the dimensions which, according to the invention have to follow certain ratios with regard to each other if a heretofore not obtainable good degree of efficiency of the blower is to be obtained. With regard to the radius of curvature $r$, according to this feature of the invention the following relationship has proved favorable:

$$\frac{1}{10} < \frac{r}{d_1} < \frac{1}{6}$$

similarly for the width $b_1$ of the impeller:

$$\frac{1}{3.6} < \frac{b_1}{d_1} < \frac{1}{2.8}$$

and further for the diameter ratio the relationship:

$$\frac{d_1}{d_2} > 0.55$$

With regard to the pre-twist to be imposed upon the air taken in, it has been found advantageous to design the hub 10 of the guiding apparatus 9 as a hollow hub. In this way a twist-free small core stream or flow will fill the center. This arrangement will prevent the creation of a whirl core which otherwise would be created in view of the necessary strong twist imparted upon the air taken in. The hollow design of the hub is an important feature of the present invention. To control the blower, the blades of the guiding device 9 or portions thereof (for instance with a multi-part design of the blades) may be turned in a manner known per se or an elastic deformation may be effected. In contrast to the heretofore known designs of controllable guiding devices for radial blowers, according to the present invention the zero position is obtained at a strong central twist so that a counter twist is hardly necessary.

It may be added that in FIG. 2 the blades of the guiding device 9 are shown fixed, i.e. as not turnable in order to simplify the showing. Moreover it does not appear to be necessary to show these blades as being adjustable since control arrangements for guiding devices are known per se.

Figure 5:
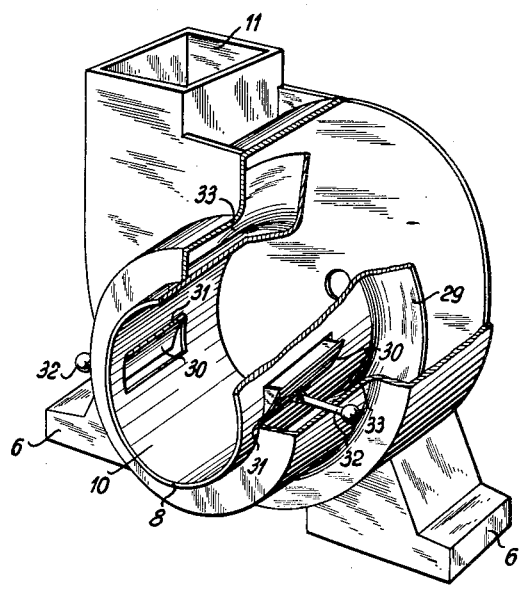
FIG. 5 is a perspective view of a spiral casing of a radial blower provided with means for producing a twist or rifling effect.

FIG. 5 shows an embodiment of the invention according to which the withdrawn air has imparted thereupon a twist without the necessity of providing guiding blades, for instance with strongly corrosive dust. The intake connection 8 is surrounded by an annular channel or spiral channel 33. This channel 33 communicates with the spiral-shaped annular channel of the spiral casing 3. One or more sections of the channel or passage 33 is or are provided with flaps 30 through which compressed air enters tangentially into the intake conduit. The specific embodiment shown in FIG. 5 comprises two flaps 30 which are shown in opened position. The flaps are hinged by means of hinges 31 and can be opened and closed for instance manually by levers 32. By designing the annular channels or spiral channels or passages 33 in conformity with the laws of flow as they are known from the construction of the spiral casing, care can be taken that the major portion of the kinetic energy of the compressed air branched off from the spiral casing will be maintained, i.e. losses by turbulence caused by too sudden a deviation of the flow will practically be completely avoided.

Figure 6:
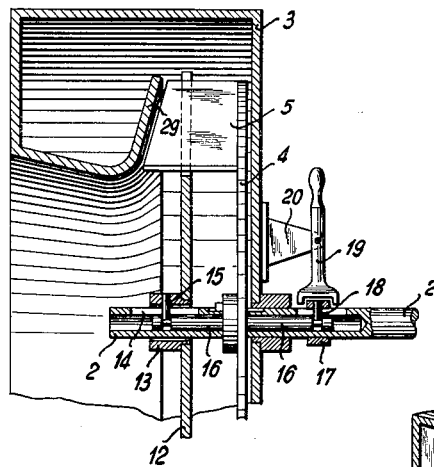
FIG. 6 is a longitudinal section through a radial blower with regulating device.
Figure 7:
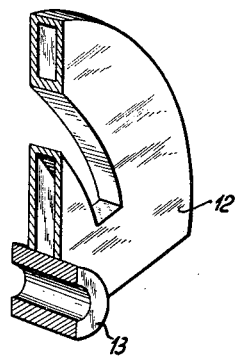
FIG. 7 is a partial section of a control mechanism.

According to a further embodiment of the invention, a good control of the blower will be obtained by providing a disc 12 as shown in FIGS. 2 and 6. This disc 12 is displaceable in the impeller and slightly surrounds all blades. The disc 12 has a greater diameter than the impeller and is annularly closed within its outer circumferential range. This is desirable for reasons of strength. In order to increase the strength of the disc 12, its outer circumferential range may be designed as a reinforced ring. In order to reduce the danger of bending and distortion, the disc may be designed as a hollow sheet metal box as shown for instance in FIG. 7. The disc 12 is connected to the hub 13 which is displaceably mounted on the hollow shaft 2. The shaft 2 has a recess 14 (FIG. 6) through which a pin 15 mounted in the hub 13 extends into the bore of the shaft 2 and there engages a groove at one end of the slide 16. At the other end of the slide 16 there is provided a further groove engaged by the pin 18 which is mounted in a ring 17 displaceably arranged on the shaft 2. A lever 19 supported by a bracket 20 mounted on the spiral casing 3 has its fork-shaped end in engagement with the ring 17. This construction makes it possible by adjusting the lever 19 to bring about a displacement of the disc 12 on shaft 2. The effect of this displacement consists in a change in the admission of fluid to the blades of the impeller. The described adjustment may be provided in addition to the above mentioned adjustment of the guiding device.

The annular chamber or space shown in each of FIGS. 2, 4, 6, and 8 between the inlet side wall of casing 3 and disc 29 forms a portion of the preceding swirl means intended to aid in the production of an intensive gas-dust mixture.

Figure 8:
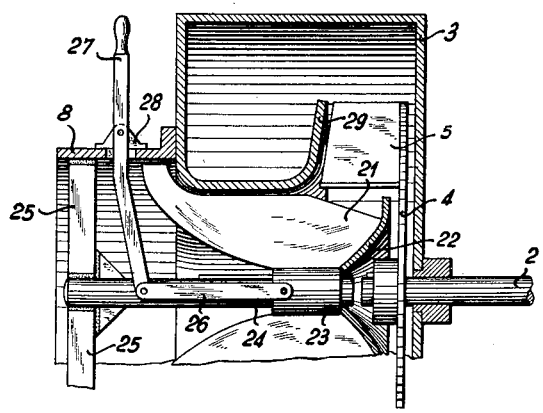
FIG. 8 is a longitudinal section through a modified radial blower with control mechanism.

According to a further feature of the invention, the displaceable disc may also be united with or joined to the guiding apparatus as shown in FIG. 8. The blades 21 of the guiding apparatus are arranged near the blades 5 of the impeller 4 so that the air having a strong twist imparted thereupon will not have to pass over an unnecessary long distance when flowing from the guiding device to the blades 5. With an arrangement according to this feature of the invention, a hollow hub as shown in FIG. 2 is not necessary. The guide blades 21 are connected for instance to a body 22 which corresponds to the disc 12 of FIG. 5. The body 22 is arranged on the hub 23 which is displaceably mounted on shaft 24. Shaft 24 in carried by members 25 which are arranged in a cross-like manner and are connected to the intake connection 8. The hub 23 and thus the entire guiding apparatus may be axially displaced through the intervention of levers 26 and 27 which latter are journalled in the support 28. The arrangement according to this feature makes it possible by displacing the entire guiding device, to bring about a favorable control in the suction pipe without any material losses.

It is, of course, understood that the present invention is, by no means, limited to the particular constructions shown in the drawings but also comprises any modifications within the scope of the appended claims.

What I claim is:

1. In a radial blower having a spiral casing with axial intake means and with tangential outlet means: an impeller rotatably journalled in said casing and provided with rearwardly curved blades, the blade angles of said impeller blades being within the range of from 38° to 58°, measured between the blade and a line extending at right angles to a radius passing through the point being measured, the blade angle measured at any point on any of the blades falling within a range of plus or minus 5° from a predetermined median value of blade angle, said blade angle being greater than the angle of friction of dust material in the air passing through the blower.

2. A blower according to claim 1, in which the width of said impeller follows the relationship $$\frac{1}{3.6} < \frac{b_1}{d_1} < \frac{1}{2.8}$$

$b_1$ representing said width, and $d_1$ representing the inner diameter of said impeller at the inner tips of said blades.

3. In a radial blower having a spiral casing with axial intake means and the tangential outlet means: an impeller rotatably journalled in said casing and provided with rearwardly curved blades, the blade angles of said impeller blades being within the range of from 38° to 58°, measured between the blade and a line extending at right angles to a radius passing through the point being measured, the blade angle measured at any point on any of the blades falling within a range of plus or minus 5° from a predetermined median value of blade angle, and lowest value of blade angle being at least slightly in excess of the friction angle of the dust material in the air to be conveyed by said blower.

4. A radial blower having a spiral casing with tangential outlet means and with a cover plate provided with an axial tubular intake section, said intake section terminating at the inner end in an outwardly flared frusto-conical section, said blower also including an impeller rotatably journalled in said casing and provided with blades, said outwardly flared frusto-conical section having an included angle of at least 76° to 80°, the blade angles of said impeller blades being with the range of from 38° to 58° measured between the blade and a line extending at right angles to a radius passing through the point being measured, the blade angle measured at any point on any of the blades falling within a range of plus or minus 5° from a predetermined median value of blade angle.

5. A radial blower having a spiral casing with tangential outlet means and with a cover plate provided with an axial tubular intake section, said intake section terminating at the inner end in an outwardly flared frusto-conical section, and a rounded section interconnecting said tubular section and said outwardly flared frusto-conical section, said blower also including an impeller rotatably journalled in said casing and provided with blades; said outwardly flared frusto-conical section having an included angle of at least 76° to 80°, while the radius of curvature of said rounded section follows the relationship $$\frac{1}{10} < \frac{r}{d_1} < \frac{1}{6}$$

where $r$ designates said radius of curvature and $d_1$ designates the inner diameter of said impeller at the inner tips of said blades; the blade angles of said impeller blades being within the range of from 38° to 58°, measured between the blade and a line extending at right angles to a radius passing through the point being measured, the blade angle measured at any point on any of the blades falling within a range of plus or minus 5° from a predetermined median value of blade angle.

6. In a radial blower having a spiral casing with axial intake means and with tangential outlet means: an impeller rotatably journaled in said casing and provided with rearwardly curved blades, the blade angles of the blades of said impeller being within the range of from 38° to 58°, the blade angle measured at any point on any of the blades falling within a range of plus or minus 5° from a predetermined median value of blade angle, said impeller having an outer diameter at the outer tips of the blades and an inner diameter at the inner tips of the blades, the ratio of said inner diameter to said outer diameter being greater than 0.55.

7. In a radial blower for blowing air laden with dust, said blower having a spiral casing with axial intake means and with tangential outlet means; an impeller rotatably journalled in said casing and provided with rearwardly curved blades, the blade angles of said impeller blades being within the range of from 38° to 58°, measured between the blade and a line extending at right angles to a radius passing through the point being measured, the blade angle measured at any point on any of the blades falling within a range of plus or minus 5° from a predetermined median value of blade angle, said blade angle exceeding by about 8° the angle of friction of the dust material with which the air passing through the blower is laden.

8. A radial blower according to claim 7, in which the axial intake means terminates adjacent the impeller in an outwardly flared frusto-conical section.

9. A radial blower according to claim 8, in which the said impeller comprises a back plate on the side thereof opposite the inlet side and to which said back plate the said blades are connected so as to project toward the inlet side of the fan, and said frusto-conical section being disposed closely adjacent the axial ends of the blades opposite the ends of the blades which are connected with said back plate.

References Cited in the file of this patent

UNITED STATES PATENTS

| | | |
|---|---|---|
| Re. 22,238 | Clements | Dec. 22, 1942 |
| 1,548,082 | Wise et al. | Aug. 4, 1925 |
| 1,787,654 | Anderson | Jan. 6, 1931 |
| 1,787,655 | Anderson | Jan. 6, 1931 |
| 1,834,959 | May | Dec. 8, 1931 |
| 2,037,880 | Charavay | Apr. 21, 1936 |
| 2,083,184 | Anderson | June 8, 1937 |
| 2,143,100 | Anderson | Jan. 10, 1939 |
| 2,327,841 | Hagen | Aug. 24, 1943 |
| 2,431,398 | Hasbrouck | Nov. 25, 1947 |
| 2,435,091 | Meyer | Jan. 27, 1948 |
| 2,435,092 | Meyer | Jan. 27, 1948 |
| 2,458,041 | Wessel | Jan. 4, 1949 |
| 2,459,815 | Hammell | Jan. 25, 1949 |
| 2,470,966 | Abbott et al. | May 24, 1949 |
| 2,495,855 | Marcoe | Jan. 31, 1950 |
| 2,588,198 | Bevington | Mar. 4, 1952 |
| 2,658,665 | Tschudy | Nov. 10, 1953 |
| 2,684,521 | Morrison | July 27, 1954 |
| 2,692,080 | Schwaiger | Oct. 19, 1954 |
| 2,743,054 | Preis | Apr. 24, 1956 |
| 2,793,804 | Woodbury | May 28, 1957 |
| 2,798,658 | McDonald | July 9, 1957 |
| 2,834,534 | Kadosch et al. | May 13, 1958 |

FOREIGN PATENTS

| | | |
|---|---|---|
| 282,188 | Italy | Feb. 4, 1931 |
| 339,720 | Great Britain | Dec. 18, 1930 |
| 882,017 | France | Feb. 8, 1943 |

OTHER REFERENCES

Serial No. 344,165, Baj (A.P.C.), published May 25, 1943.